(12) United States Patent
Strauss (10) Patent No.: US 11,757,929 B2
(45) Date of Patent: Sep. 12, 2023

(54) TRAFFIC-SHAPING HTTP PROXY FOR DENIAL-OF-SERVICE PROTECTION

(71) Applicant: Pantheon Systems, Inc., San Francisco, CA (US)

(72) Inventor: David Timothy Strauss, San Francisco, CA (US)

(73) Assignee: Pantheon Systems, Inc., San Francisco, CA (US)

(*) Notice: Subject to any disclaimer, the term of this patent is extended or adjusted under 35 U.S.C. 154(b) by 204 days.

(21) Appl. No.: 17/332,835

(22) Filed: May 27, 2021

(65) Prior Publication Data

US 2022/0385690 A1     Dec. 1, 2022

(51) Int. Cl.
*H04L 9/40* (2022.01)
*H04L 47/56* (2022.01)
*H04L 47/62* (2022.01)

(52) U.S. Cl.
CPC ........ *H04L 63/1458* (2013.01); *H04L 47/562* (2013.01); *H04L 47/622* (2013.01); *H04L 63/1425* (2013.01)

(58) Field of Classification Search
CPC . H04L 63/1458; H04L 47/562; H04L 47/622; H04L 63/1425
See application file for complete search history.

(56) References Cited

U.S. PATENT DOCUMENTS

| | | | | |
|---|---|---|---|---|
| 8,520,522 B1* | 8/2013 | Goldman | ............... | H04L 47/26 370/235 |
| 9,015,019 B1* | 4/2015 | Kim | ............... | H04W 74/00 703/13 |
| 11,457,040 B1* | 9/2022 | Sole | ............... | H04L 63/101 |
| 11,457,080 B1* | 9/2022 | Meduri | ............... | H04L 67/60 |
| 11,558,412 B1* | 1/2023 | Drake | ............... | H04L 63/1433 |
| 2010/0318495 A1* | 12/2010 | Yan | ............... | G06F 16/27 707/618 |
| 2011/0040876 A1* | 2/2011 | Zhang | ............... | G06F 11/3442 703/2 |
| 2016/0044531 A1* | 2/2016 | Papa | ............... | H04W 28/0289 370/230 |
| 2019/0230182 A1* | 7/2019 | Martin | ............... | H04L 63/0227 |
| 2020/0220875 A1* | 7/2020 | Harguindeguy | .... | H04L 63/1425 |
| 2022/0004432 A1* | 1/2022 | Kobayashi | ............ | G06F 9/5005 |
| 2022/0075782 A1* | 3/2022 | Hines | ............... | G06F 16/211 |
| 2022/0078149 A1* | 3/2022 | Hines | ............... | H04L 63/0428 |
| 2022/0086215 A1* | 3/2022 | Rowe | ............... | H04L 67/02 |
| 2022/0091958 A1* | 3/2022 | Buffone | ............... | G06F 11/079 |

(Continued)

OTHER PUBLICATIONS

Ranjan S., et al: "DDoS-Shield: DDoS-Resilient Scheduling to Counter Application Layer Attacks", IEEE /ACM Transactions on Networking, IEEE / ACM, vol. 17, No. 1, Feb. 1, 2009 (Feb. 1, 2009), pp. 26-39.

*Primary Examiner* — Stephen T Gundry
(74) *Attorney, Agent, or Firm* — Foley & Lardner LLP (57) ABSTRACT

In accordance with some aspects of the present disclosure, an apparatus is disclosed. In some embodiments, the apparatus includes a processor and a memory. In some embodiments, the memory includes programmed instructions that, when executed by the processor, cause the apparatus to receive a request from a client; determine family of metrics; schedule the request based on the family of metrics; and in response to satisfying one or more scheduling criteria, send the request to a backend server.

14 Claims, 5 Drawing Sheets

(56) References Cited

U.S. PATENT DOCUMENTS

| | | | | |
|---|---|---|---|---|
| 2022/0094741 A1* | 3/2022 | Kothandaraman | ..... | H04L 69/28 |
| 2022/0116481 A1* | 4/2022 | Katta | ..... | H04L 69/329 |
| 2022/0124173 A1* | 4/2022 | Girbal | ..... | H04L 67/01 |
| 2022/0197773 A1* | 6/2022 | Butler | ..... | G06F 9/5038 |
| 2022/0198538 A1* | 6/2022 | Francis | ..... | G06Q 30/0635 |
| 2022/0217153 A1* | 7/2022 | Krishnan | ..... | H04L 63/108 |
| 2022/0247686 A1* | 8/2022 | Rajagopalan | ..... | H04L 63/1416 |
| 2022/0247829 A1* | 8/2022 | Vilcinskas | ..... | H04L 69/22 |
| 2022/0272041 A1* | 8/2022 | Blakey | ..... | H04L 69/40 |
| 2022/0278917 A1* | 9/2022 | Voderbet | ..... | H04L 43/0829 |
| 2022/0286501 A1* | 9/2022 | Musumeci | ..... | H04L 67/101 |
| 2022/0329609 A1* | 10/2022 | Li | ..... | H04L 63/0263 |
| 2022/0360560 A1* | 11/2022 | Velugu | ..... | G06N 20/00 |
| 2022/0360565 A1* | 11/2022 | Shribman | ..... | H04L 63/029 |
| 2022/0405342 A1* | 12/2022 | Lepeska | ..... | H04L 67/5682 |

* cited by examiner

TRAFFIC-SHAPING HTTP PROXY FOR DENIAL-OF-SERVICE PROTECTION

BACKGROUND

A Denial of Service (DoS) attack can be a malicious attempt to affect the availability of a targeted system, such as a website or application, to legitimate end users. In some aspects, attackers generate large volumes of packets or requests that can overwhelm a target system. In case of a Distributed Denial of Service (DDoS) attack, the attacker can use multiple compromised or controlled sources to generate the attack.

SUMMARY

In accordance with some aspects of the present disclosure, an apparatus is disclosed. In some embodiments, the apparatus includes a processor and a memory. In some embodiments, the memory includes programmed instructions that, when executed by the processor, cause the apparatus to receive a request from a client; determine a family of metrics; schedule the request based on the family of metrics; and in response to satisfying one or more scheduling criteria, send the request to a backend server.

In accordance with some aspects of the present disclosure, a computer-implemented method is disclosed. In some embodiments, the method includes receiving a request from a client; determining a family of metrics; scheduling the request based on the family of metrics; and in response to satisfying one or more scheduling criteria, sending the request to a backend server.

In accordance with some aspects of the present disclosure, a non-transitory computer readable storage medium is disclosed. In some embodiments, the non-transitory computer readable storage medium comprising instructions stored thereon that, when executed by a processor, cause the processor to receive a request from a client; determine a family of metrics; schedule the request based on the family of metrics; and in response to satisfying one or more scheduling criteria, send the request to a backend server.

The foregoing summary is illustrative only and is not intended to be in any way limiting. In addition to the illustrative aspects, embodiments, and features described above, further aspects, embodiments, and features will become apparent by reference to the following drawings and the detailed description.

The foregoing and other features of the present disclosure will become apparent from the following description and appended claims, taken in conjunction with the accompanying drawings. Understanding that these drawings depict only several embodiments in accordance with the disclosure and are therefore not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Some implementations of websites with backends (e.g., dynamic backends, backend servers, servers executing instructions in PHP, Java, Ruby, etc.) generate responses (e.g., dynamic responses) as replies to requests from users. In some implementations, the website leverages a caching proxy, in the form of a content delivery network (CDN), between a user agent and the backend. While this proxy is helpful for scaling a site's traffic under normal circumstances, attackers often bypass the proxies by constructing requests known to miss the cache. For example, an attacker may request the homepage of a web site but include a randomized query string, causing the cache to miss and burdening the dynamic backend. Applied aggressively enough, the dynamic backend gets overwhelmed and can no longer service the requests of normal users.

Various mechanisms not included in some embodiments of the disclosure are directed to preventing attackers from burdening the backend. Implementations that block attacker Internet Protocols (IPs) require manual review of traffic to identify attacking IPs and risk blocking legitimate traffic when a given IP is sending both (e.g., network address translation). Implementations of user agent telemetry delay legitimate users until their browsers have passed analysis, give false positives of bot detection for legitimate but privacy-conscious users, and are computationally expensive. Implementations that allow-based web application firewall (WAF) are time-intensive to set up and maintain, can cause downtime if not updated in sync with related site changes, and are incapable of protecting interactions where request entropy must be high (e.g., full-text searching). Implementations that use rate limiting can break legitimate interactions, and attackers can fly under the rate.

In general, approaches not disclosed in embodiments herein suffer from high-stakes Boolean decisions about whether a client or request is an attack. Falsely identifying a legitimate request as an attack causes downtime and frustration. Falsely identifying an attacking request as legitimate results in a gap of protections. The methods not disclosed in embodiments herein require properly classifying in both directions (with limited tolerance for being permissive with attackers). Moreover, attackers evolve to make distinguishing attackers from legitimate users ever harder. Also, the approaches not disclosed in embodiments herein risk negative effects when the backend is not overwhelmed.

Disclosed herein are implementations of a proxy server that tracks a family of metrics, which can include cumulative utilization time for clients. In some implementations, the proxy prioritizes requests from clients that have not been "greedy" in their backend utilization and providing an authenticated bypass capability for clients that may appear "greedy" but are desirable. Client classification is on a spectrum of utilization time (e.g., backend processing time, client pressure, greediness) rather than a Boolean determination of the request being an attack/not attack or a client being an attacker/not attacker. The proxy server can proportionally de-prioritize clients in a way that punishes attackers for their own backend greediness, linking mitigation directly to attack effectiveness. The family of metrics can include a cumulative backend queue time of various requests on a backend server. The backend queue time (e.g., backend internal queue time) of a request can be associated with the time a request waits for resources of the backend server to become available. In some embodiments, the family of metrics includes both the cumulative utilization time and the cumulative backend queue time. The proxy server can schedule each request in accordance with a delay, wherein the delay is a function of cumulative utilization time and the cumulative backend queue time.

A denial-of-service attacker has two paths for overwhelming the backend: slow/cache-busting (heavy) requests and a large, distributed number of agents. Because each agent increases attack cost, an attacker generally has each agent make as many heavy requests as possible, only scaling the number of agents to scale up the overall attack or as a costly measure to evade rate- and IP-based protection mechanisms.

In some implementations disclosed herein, a proxy server imposes costs on a prospective attacker by penalizing requests from clients with a history of heavy requests, thereby requiring an attacker to have enough agents that they each occupy the backend no more than a typical, legitimate visitor would. Embodiments disclosed herein make the cost of attacking prohibitive. Because the scheduling only determines order of service—and service happens as fast as the backend permits—there is little effect to deprioritizing a greedy client until resources become scarce.

Advantageously, absent backend resource contention, adding the proxy server may have little-to-no effect. The greed heuristic may not require configuration custom to a site. As long as an attacker consumes backend time, it may not escape increasing its greed score.

One advantage of scheduling requests on the proxy side, rather than placing the requests in various queues on the server side, is that attacker requests are less likely to consume the capacity of the backend server and increase latency of processing legitimate requests.

Additionally, disclosed herein are implementations of determining a backend utilization time and a backend queue time of a request based on information provided as part of the request and its response. In some embodiments, the proxy server calculates the backend utilization time based on time information provided from the server and timestamps generated by the proxy server.

One advantage of having the proxy server calculate the backend utilization time, rather than having a backend server calculate the backend utilization time and set it as a response header, is that header values are not usually possible to set at an end of a response unless a component is configured to buffer a hypertext transfer protocol (HTTP) body of the response, which can be inefficient and foreign to a customer using or otherwise operating the backend server. Moreover, in some embodiments, by using the proxy server to calculate the backend utilization time, some embodiments of the present disclosure can decouple the inbound and outbound portions of the proxy server, as long as there is accounting on the egress path that feeds back to metrics for the ingress path. For example, the proxy server can be configured to use a load balancer that leverages direct server return.

Figure 1:
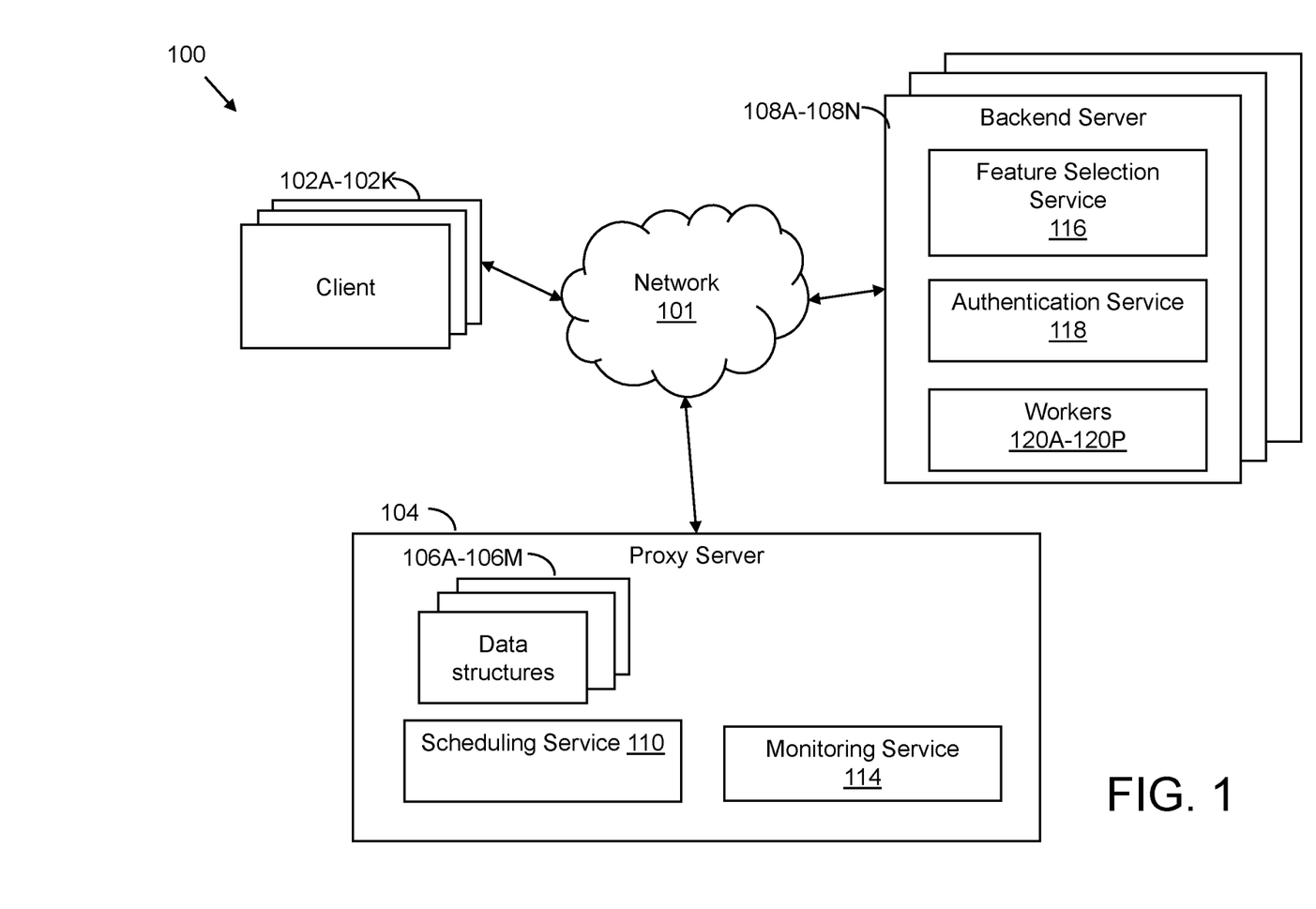
FIG. 1 illustrates a block diagram of a computing environment, in accordance with some embodiments of the present disclosure.

FIG. 1 illustrates a block diagram of computing environment 100, in accordance with some embodiments of the present disclosure. In some embodiments, the computing environment 100 includes a number of clients 102A-102K. Each of the clients 102A-102K can send a request such as a hypertext transfer protocol (HTTP) request. In some embodiments, each of the clients 102A-102K is a user agent (e.g., a browser or other application). In some embodiments, each of the clients 102A-102K is a user computing device coupled to a respective user agent.

The computing environment 100 includes a proxy server 104 in communication with the one or more clients 102A-102K (or their corresponding user agents) through a network 101. The proxy server 104 can receive the request. In some embodiments, the proxy server 104 includes a number of data structures 106A-106M. Each of the data structures 106A-106M may include (e.g., store) one or more pending requests (e.g., pending HTTP requests). The data structures 106A-106M may be implemented as scheduling buffers, memory, storage, etc. In some embodiments, each pending request occupies a lightweight thread (e.g., a lightweight thread managed by a runtime, a green thread, a goroutine). In some embodiments, the data structures 106A-106M include each of the threads corresponding to the respective pending requests.

The computing environment 100 includes a number of backend servers 108A-108N in communication with the proxy server 104 through the network 101 or a second network. While some of the disclosure refers to "a backend server 108A," it is understood that the operations described with respect to the backend server 108A may apply to any of the backend servers 108A-108N without departing from the scope of the present disclosure. In some embodiments, the proxy server 104 may insert the request in one of the data structures 106A-106M. In some embodiments, the backend server 108A receives scheduled requests from one of the data structures 106A-106M (e.g., in a first-in-first-out (FIFO) order). In some embodiments, a number of requests that the backend server 108A can receive in a time interval is limited by bandwidth (e.g., network bandwidth).

In some embodiments, the proxy server 104 includes a scheduling service 110. The scheduling service 110 can schedule a first request. In some embodiments, the scheduling service 110 determines a delay and/or selects a scheduling position based on a delay (e.g., client activity, backend utilization time, backend activity, backend queue time, a combination thereof, etc.), or a score indicating client greed (e.g., client activity, backend utilization time), of a number of second requests. One or more of the second requests can be before and/or concurrent with the first request. Each of the second requests may be a request made by the same client that made the first request, for which a response was received. For example, the client 102A made the request, and the scheduling service 110 schedules the request based on a cumulative (e.g., alpha decayed sum) backend utilization time of all requests made by the client 102A for which the proxy server 104 returned a respective response from the backend server 108A.

In some embodiments, the delay is a function of a family of metrics that include one or more of a backend-linked metric, a client-linked metric, or a request aversion metric.

The backend-linked metric can indicate an estimate of a website's current backend pressure irrespective of the client that caused it. In some embodiments, the backend-linked metric includes a cumulative backend queue time. In some embodiments, the cumulative backend queue time is determined, in milliseconds, as an average backend queue time within a predetermined range (e.g., at or within a 95th percentile), although the cumulative backend queue time can be determined using various other expressions without departing from the scope of the present disclosure. In some embodiments, the backend-linked metric includes one or more of the cumulative backend queue time, load average (e.g., a measure of an amount of work that a computer system such as the backend server 108A performs), direct monitoring of available worker processes/threads, active monitoring of a defined test request, or the like.

The client-linked metric (e.g., client greed) may indicate recent pressure that resulted from the client's requests and/or a characterization of the client that may be relevant in determining how to schedule the client's request. In some embodiments, the client-linked metric includes a cumulative backend utilization time. In some embodiments, the cumulative backend utilization time is a sum of backend utilization time of various requests. In some embodiments, the client-linked metric includes one or more of the cumulative backend utilization time, a bot detection heuristic, indicators of a client's self-representation (e.g., admissions of being a bot), external reputation (e.g., IP reputation) data, or the like.

The request aversion metric may use aspects of the request, independent of a client's history or nature, as a metric. In some embodiments, the request aversion metric includes some combination of a request HTTP verb (e.g., POST or GET), Uniform Resource Locator (URL) parameters (e.g., presence or nature of a query string), parameters or descriptors that a web application firewall (WAF) may use, or other parameters or descriptors associated with the request.

In some embodiments, the delay values recent backend utilization time more substantially than older data by using various techniques. In some embodiments, the sum is alpha-decayed such that more recent backend utilization time is weighted greater than less recent backend utilization time. Although the cumulative backend queue time is herein described as an alpha-decayed sum, the cumulative backend queue time can be determined using various other expressions without departing from the scope of the present disclosure.

In some embodiments, the delay is a function of estimated backend concurrency, which can be tracked by having a sum of sent requests and responses, with the value having some alpha decay to converge on zero if there is a mismatch from the lack of those pairing up.

In some embodiments, the delay is a function of a random floating point value from 0 to 1. Advantageously, this prevents stampede effects from bunching up a batch of requests with a same delay, which may risk overwhelming the backend. In some embodiments, the delay is a function of a sleep scaling factor, which may be determined based on a power-law regression wherein zero maps to (e.g., returns) zero and a first predetermined number (e.g., 9) maps to a second predetermined number (e.g., 10). Some intermediate values may ensure that the first few buckets map to values just above zero.

In some embodiments, the delay is calculated using the following equation:

$$delay = (bp95 + bc)/10 * cp * sleep\_scaling\_factor * rnd/1000, \quad (1)$$

wherein delay is the delay, bp95 is the cumulative backend queue time, bc is the estimated backend concurrency, cp is the cumulative backend utilization time, sleep_scaling_factor is the sleep scaling factor, and rnd is the random floating-point value. The delay can be calculated using various other combinations of the disclosed parameters or other parameters while remaining within the scope of the present disclosure. Although the delay parameters have been nominalized using certain values (e.g., 10 and 1000), any of various values can be used for nominalizing the delay parameters without departing from the scope of the present disclosure.

In some embodiments, the scheduling service 110 identifies the client by one or more attributes. The scheduling service 110 can identify a client based on one or more of an address (e.g., IPv4 address), client-provided attributes (e.g., a user agent HTTP header), or other headers or factors.

The scheduling service 110 can determine a delay for each configured single (e.g., IP address) and/or hybrid (e.g., IP address and user agent) identification pattern. The scheduling service 110 can implement the delay by accounting for backend time (e.g., backend utilization time and/or backend queue time) against each identification pattern by using a metric (e.g., a counter, a sum, a score, an amount or percentage, etc.). For example, if a backend utilization time is a second, then the scheduling service 110 can attribute a second of backend time against to both of a first counter identified by the IP address and a second counter identified by a combination of the IP address and the user agent. In some embodiments, when a new request arrives, the request's delay is a sum of applicable counters. For example, if the client used 1 second of backend utilization, and counters are used for the IP address and the combination of the IP address and the user agent, the request's delay attributed to the request is 2. A request coming from the same IP address, but a different user agent, can be scored as a 1.

Each of the counters may have an associated weight. For example, greed attributed to the combination of the IP address and the user agent may count as a first delay product of a first weight and the backend time, whereas greed attributed to the IP address may count as a second delay product of a second weight and the backend time. Advantageously, associating weights with different identification patterns may avoid punishing legitimate users who happen to share the same IP address while making evasion difficult for attackers.

In some embodiments, the scheduling service 110 can track the delay using decay (e.g., alpha decay, using weights proportional to, or that otherwise correspond, to time, etc.). Disclosed herein are some embodiments of alpha decay. In some embodiments, a delay decays at a predetermined decay rate. In some implementations, a counter includes the delay and an elapsed time since a last update. In some embodiments, the delay is attenuated when read or when updated. In some embodiments, the delay gets attenuated by an amount which is a combination of the predetermined decay rate and the elapsed time since the last update. When incrementing the counter (e.g., attributing backend time of new requests), a new delay may be the attenuated delay at that moment plus an amount being added/attributed due to the new request. When incrementing the counter, the elapsed time since a last update may get updated/refreshed to a current time. In some embodiments, in using alpha decay, activity in a first predetermined time interval (e.g., a most recent minute) count towards a first percentage (e.g., 100%) of a score, while activity in a second predetermined time interval (e.g., a minute occurring an hour ago) may count for a second percentage (e.g., 5%) towards the score. Advantageously, using decay may alleviate excessive I/O, locking, or other impediments to scalability.

In some embodiments, a backend utilization time of a current request can be used to update the client's cumulative backend utilization time, and a backend queue time of a current request can be used to update the backend's queue utilization time. In some embodiments, the proxy server 104 generates a first timestamp and adds the first timestamp to the request as a header. In some embodiments, the backend server 108A (e.g., code on the backend server 108A) reads the first timestamp from the header and subtracts it from a second timestamp upon receiving the request to generate a time difference. The backend server 108A can set a response header with the time difference. In some embodiments, the time difference represents the backend queue time of the request. In some embodiments, the proxy server 104 generates a third timestamp and subtracts the third timestamp from a sum of the first timestamp and the time difference to generate a second time difference. In some embodiments, the second time difference represents the backend utilization time (e.g., an amount of time that a PHP processed the request). The following exemplary equations are for calculating the backend utilization time and backend queue time:

$$bqt = ts2 - ts1, \quad (2) \text{ and}$$

$$bpt = ts3 - ts2, \quad (3)$$

wherein bqt is the backend queue time, ts2 is the second timestamp, ts1 is the first timestamp, bpt is the backend processing/utilization time, and ts3 is the third timestamp.

In some embodiments, the scheduling service 110 re-evaluates a prioritization of a request for which the delay has elapsed. In some embodiments, the scheduling service 110 determines a rescheduling counter threshold associated with the request. The rescheduling counter threshold may be determined at a time after the delay has been assigned and before the delay has elapsed. In response to the delay elapsing, the scheduling service 110 can increment a rescheduling counter associated with the request. In some embodiments, if the incremented rescheduling counter does not meet or exceed (e.g., is less than) the rescheduling counter threshold, the scheduling service 110 assigns a second delay. The second delay may be different from the initial delay based on a change of at least one of the cumulative backend utilization time or the cumulative backend queue time. If the request is assigned a second delay, the scheduling service 110 increments the rescheduling counter again when the second delay elapses, and the scheduling service 110 again compares the updated rescheduling counter to the rescheduling counter threshold. This process may repeat until the updated rescheduling counter meets or exceeds the rescheduling counter, in which case the proxy server 104 (e.g., the scheduling service 110) sends the request to the backend server 108A. In some embodiments the rescheduling counter and the rescheduling counter threshold are zero by default. In some embodiments, the scheduling service 110 updates the rescheduling counter threshold to a non-zero value after the delay has been assigned.

In some embodiments, the proxy server 104 includes a monitoring service 114. In some embodiments, the monitoring service 114 informs (e.g., sends hints to) the backend server 108A of one or more of a load level, a number of discarded requests of a client in a time interval, or a client's greed score. In some embodiments, the monitoring service 114 sends hints in the form of headers.

In some embodiments, the backend server 108A includes a feature selection service 116. In some embodiments, the feature selection service 116 disables one or more features for a current request of a client in response to being informed that the backend (which is currently processing the request) has a high backend pressure time.

In some embodiments, the backend server 108A includes an authentication service 118. authentication by the authentication service 118 may include bot checks (e.g., reCAPTCHA) or federating the login to another system (e.g., SAML, Facebook login). After successful authentication, the authentication service 118 can issue a cryptographically signed cookie to a client who is authenticated (e.g., one of the clients 102A-102K). The proxy server 104 can recognize the cookie as indications of known-good actors and relax or bypass the de-prioritization that would typically affect their requests. In other words, the proxy server 104 can schedule a request of the authenticated client preferentially in data structure 106A (e.g., assign a lower-valued delay) despite the greed of the client. In some embodiments, the cookie is tied to one or more of the IP address, the user agent, or other headers or attributes used in client identity factors, by including the cookie in the signed data and associating an expiration time with the cookie. Advantageously, the bypass avoids punishing site administrators that may need to send repeated, heavy requests.

In some embodiments, the backend server 108A includes a number (e.g., cluster) of workers (e.g., resources, compute resources) 120A-120P. Each of the workers 120A-120P may be a guest virtual machine, a container, a process, a user-space process, a thread, etc. The backend server 108A may provide the request to a first available one (e.g., a first one in a queue) of the workers 120A-120P to process and/or serve the request. In some embodiments, in response to one of the workers 120A-120P processing and/or serving the request, the backend server 108A sends a response to the request to the client (of the clients 102A-102K) that sent the request or the proxy server 104 to forward to that client.

Each of the components (e.g., elements, entities) of the computing environment 100 (e.g., the one or more clients 102A-102K, the proxy server 104, the one or more data structures 106A-106M, the backend servers 108A-108N, the scheduling service 110, the monitoring service 114, the feature selection service 116, and the authentication service 118, the workers 120A-120P), is implemented using hardware, software, or a combination of hardware or software, in one or more embodiments. Some or all of the components of the computing environment 100 may be a processor with instructions or an apparatus/device including a processor with instructions, in some embodiments. In some embodiments, multiple components (e.g., the scheduling service 110, and the monitoring service 114) may be part of a same apparatus and/or processor. Each of the components of the computing environment 100 can include any application, program, library, script, task, service, process or any type and form of executable instructions executed by one or more processors, in one or more embodiments. Each of the one or more processors is hardware, in some embodiments. The apparatus may include one or more computer readable and/or executable storage media including non-transitory storage media, or memory. The instructions may be stored on one or more of the storage or memory, and the instructions, when executed by the processor, can cause the apparatus to perform in accordance with the instructions.

Figure 2:
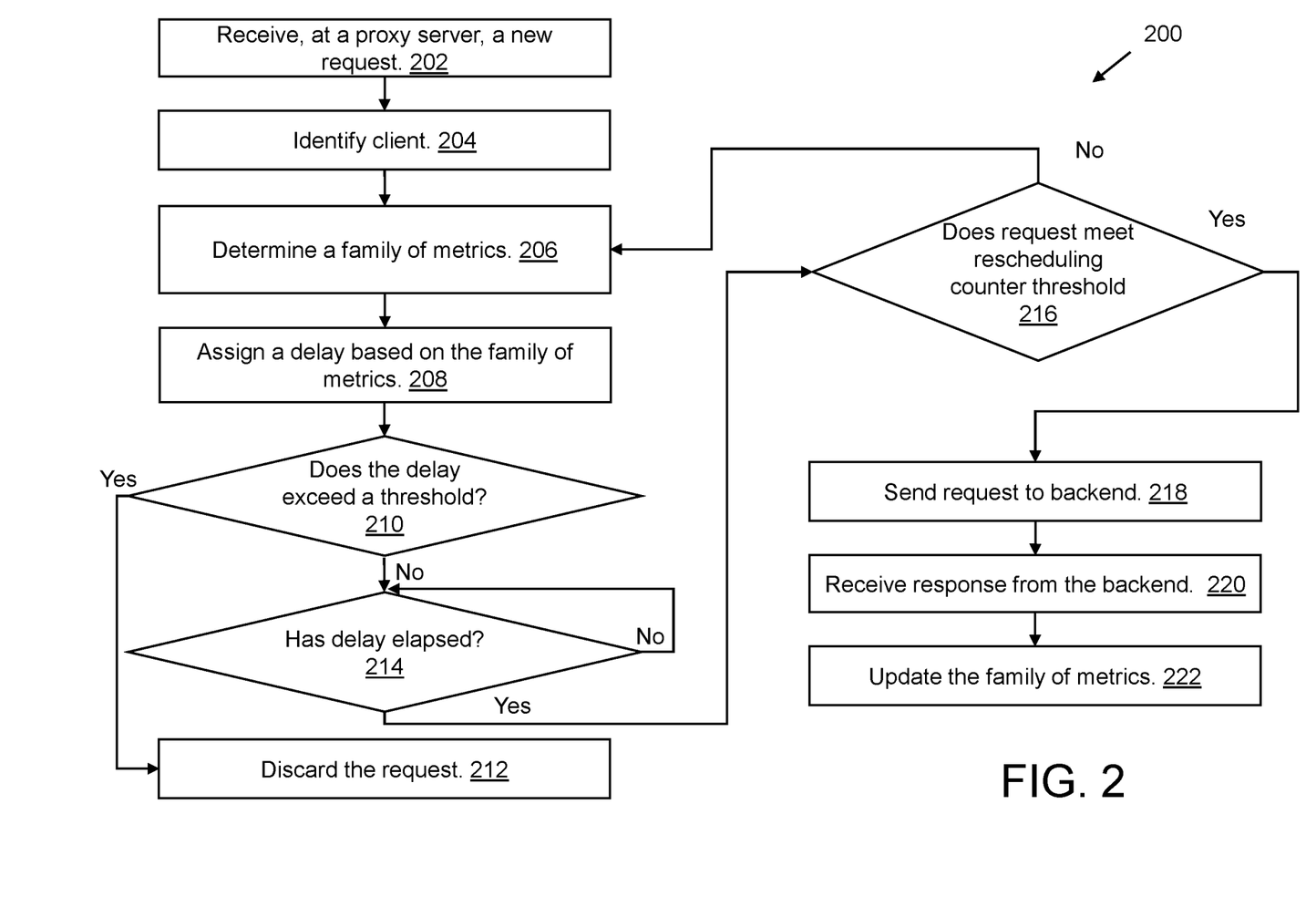
FIG. 2 is a flowchart of an example method, in accordance with some embodiments of the present disclosure.

Referring now to FIG. 2, a flowchart of an example method 200 is illustrated, in accordance with some embodiments of the present disclosure. The method 200 may be implemented using, or performed by, the computing environment 100, one or more components of the computing environment 100, or a processor associated with the computing environment 100 or the one or more components of the computing environment 100. Additional, fewer, or different operations may be performed in the method 200 depending on the embodiment.

A processor (e.g., a proxy server 104, a scheduling service 110) receives a new request (at operation 202). In some embodiments, the processor identifies a client associated with the new request (at operation 204). The processor determines a family of metrics (at operation 206). In some embodiments, the computed family of metrics is associated with one or more of backend pressure, (recent) pressure that resulted from a client's requests and/or a characterization of the client, or aspects of the request that are independent of a client's history or nature. In some embodiments, the computed family of metrics includes one or more of a cumulative backend utilization time or a cumulative backend queue time. In some embodiments, the family of metrics includes an alpha-decayed sum of one or more backend times of one or more other requests. In some embodiments, the family of metrics includes one or more of a first alpha-decayed sum of one or more backend utilization times of the one or more other requests or a second alpha-decayed sum of one or more backend queue times of the one or more other requests. In some embodiments, the family of metrics is calculated when the new request is received (e.g., or when the client identifies the client), while in other embodiments, the family of metrics is calculated and stored prior to when the new request is received (e.g., when a last other request is responded to) and is fetched when the new request is received.

The processor assigns a delay, or otherwise schedules, based on the family of metrics (at operation 208). In some embodiments, the processor calculates the delay based on family of metrics. In some embodiments, the processor determines if the delay exceeds a timeout threshold (at operation 210). If the processor determines that the delay exceeds the timeout threshold, the processor discards, or otherwise ignores, the request (at operation 212). The processor determines whether the delay has elapsed (at operation 214). In some embodiments, the processor determines whether the delay has elapsed in response to determining that that the delay does not exceed the timeout threshold. If the processor determines that the delay has not elapsed, the method 200 returns to operation 214.

If the processor determines that the delay has elapsed, in some embodiments, the processor determines whether a rescheduling counter of the request meets or exceeds a rescheduling counter threshold (at operation 216). If the processor determines that the rescheduling counter does not meet or exceed the rescheduling counter threshold, the method 200 returns to the operation 206. If the processor determines that the rescheduling counter meets or exceeds the rescheduling counter threshold, the processor sends the request to a backend server (e.g., the backend server 108A) (at operation 218). The processor receives a response from the backend server (at operation 220).

The processor updates the family of metrics (at operation 222). In some embodiments, the processor receives a time value from the backend server as part of the response. In some embodiments, the response includes the time value in a header portion. In some embodiments, the processor calculates the backend time using the time value, which is described in more detail with respect to FIG. 3.

Figure 3:
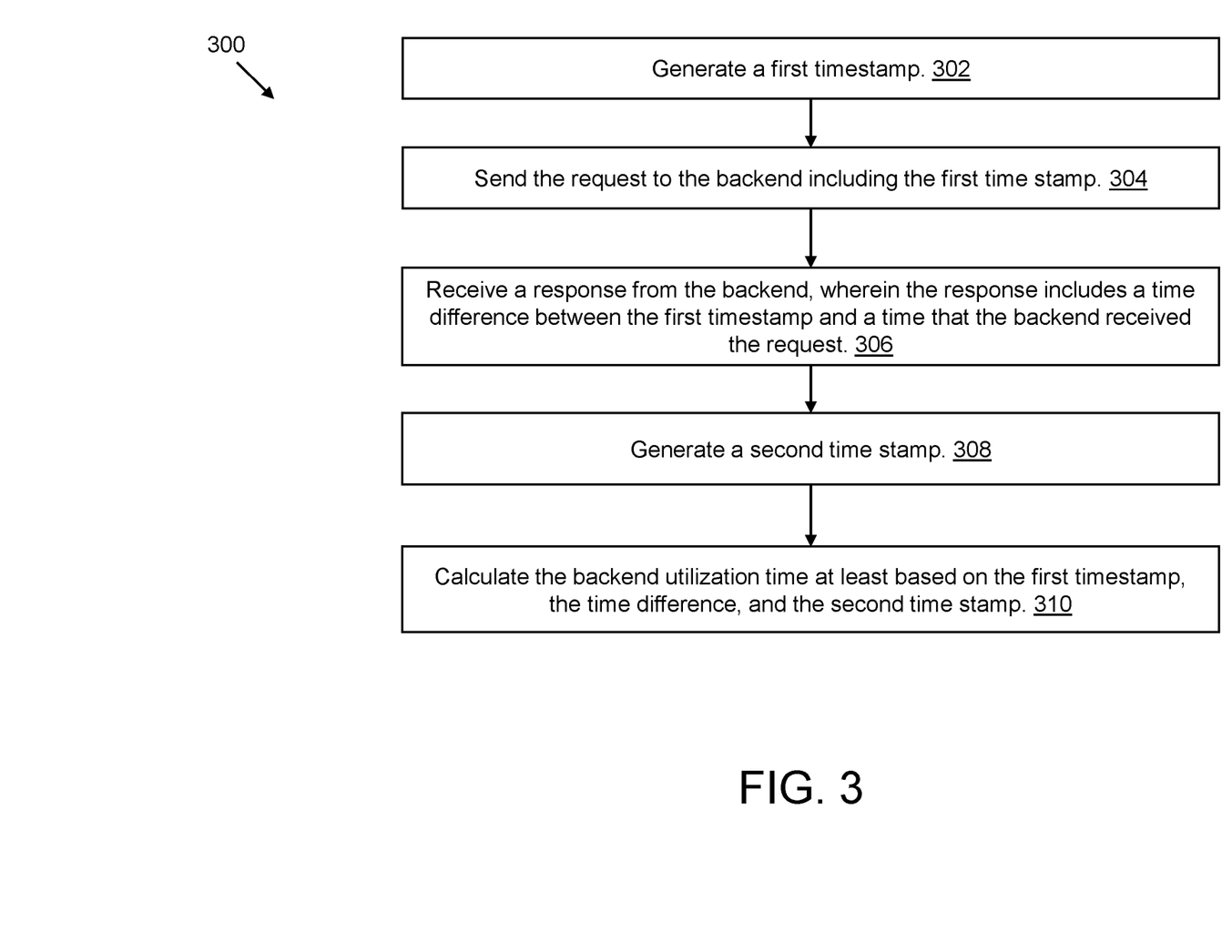
FIG. 3 is a flowchart of an example method, in accordance with some embodiments of the present disclosure.

Referring now to FIG. 3, a flowchart of an example method 300 is illustrated, in accordance with some embodiments of the present disclosure. The method 300 may be implemented using, or performed by, the computing environment 100, one or more components of the computing environment 100, or a processor associated with the computing environment 100 or the one or more components of the computing environment 100. Additional, fewer, or different operations may be performed in the method 300 depending on the embodiment. One or more operations of the method 300 can be combined with one or more of the operations of the method 200.

A processor (e.g., the proxy server 104, the scheduling service 110) generates a first timestamp (at operation 302). The processor sends the request to a backend server (e.g., the backend server 108A) including the first time stamp (at operation 304). The processor receives a response from the backend (at operation 306). In some embodiments, the response includes a time value generated by the backend server. In some embodiments, the time value is a time difference between the first timestamp and a time at which the backend received the request. The processor generates a second time stamp at a time that the processor receives a response from the backend server (at operation 308). The processor calculates the backend utilization time of the request at least based on the first timestamp, the time value, and the second time stamp (at operation 310). In some embodiments, the processor calculates the backend utilization time as a difference of the second timestamp (i.e., the time that the processor receives the response from the backend server) and the time at which the backend started working on the request (i.e., when the request has exited the queue). In some embodiments, the processor determines/identifies that the time value is the backend queue time.

Figure 4:
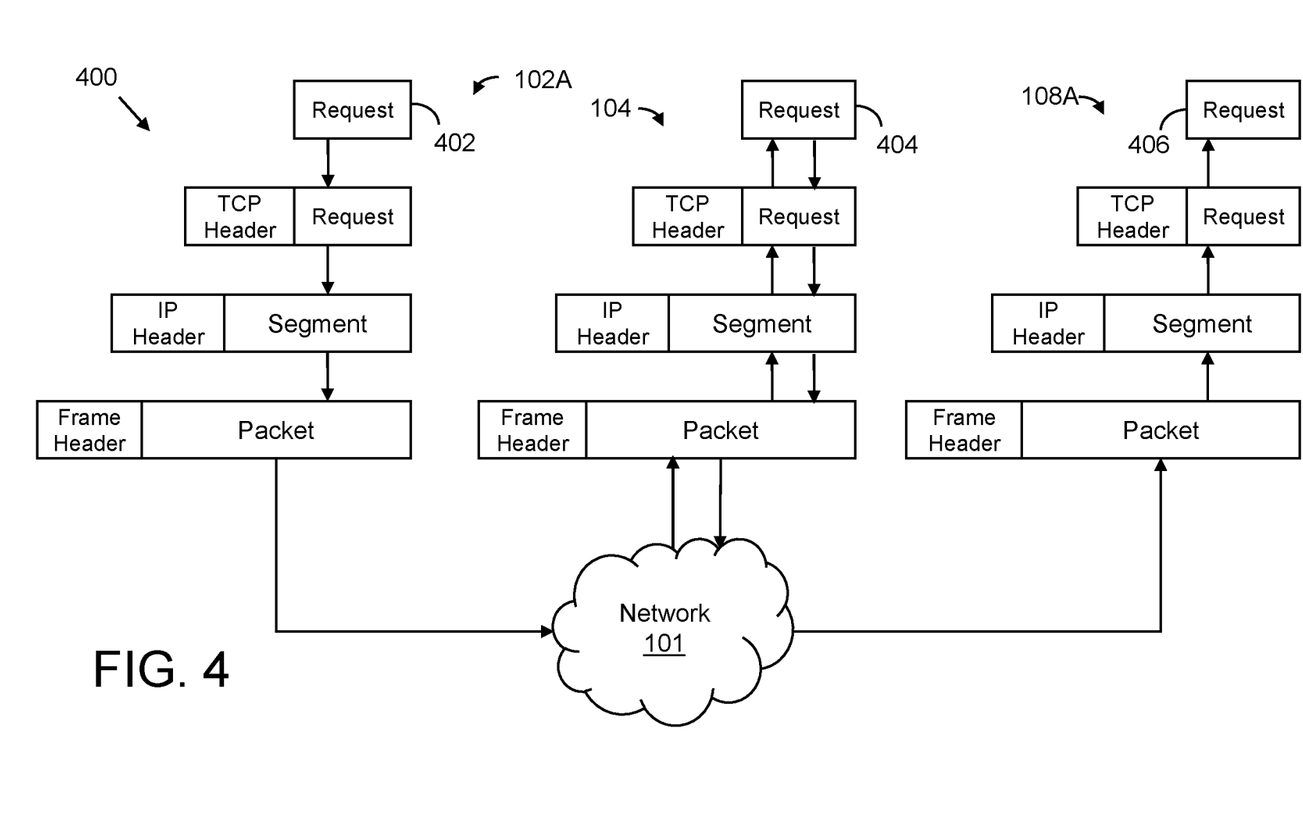
FIG. 4 is a diagram that illustrates a request transmission, in accordance with some embodiments of the present disclosure.

FIG. 4 is a diagram that illustrates a request transmission 400, in accordance with some embodiments of the present disclosure. A request 402 is generated or otherwise de-encapsulated by the client 102A at a higher layer (e.g., application layer). At the transport layer, the client 102A encapsulates the request 402 with a TCP header to generate a segment. At the network layer, the client 102A encapsulates the segment with an IP header to generate a packet. At the data link layer, the client 102A encapsulates the packet with a frame header to generate a frame. The client 102A sends the frame as bits through the network 101 to the proxy server 104.

At the data link layer, the proxy server 104 de-encapsulates the frame header to generate a packet. At the network layer, the proxy server 104 de-encapsulates the IP header to generate a segment. At the transport layer, the proxy server 104 de-encapsulates the TCP header to generate a request 404. In some embodiments, the request 404 includes a same payload/content as the request 402. At the higher layer, the proxy server 104 performs one or more services on the request. For example, the proxy server 104 can shape traffic by determining a scheduling position (e.g., determining a value of a delay to assign to the request). In some embodiments, the proxy server 104 determines whether to discard the request (e.g., based on the value of the delay). In some embodiments, the proxy server 104 performs other one or more services on the request at other layers (network, transport, data link, etc.). For example, the proxy server 104 may attribute backend utilization time to the client 102A using a TCP header.

If the proxy server 104 does not discard the request 404, the proxy server 104 may encapsulate the request 404 similarly to how the client 102A encapsulated the request 402. The proxy server 104 may send the encapsulated request (e.g., frame) as bits over the network 101 or a second network to the backend server 108A. The backend server 108A may de-encapsulate the frame from the proxy server 104 similarly to how the proxy server 104 de-encapsulated the frame from the client 102A to generate the request 406. The backend server 108A may process the request 406 and send a response to the client 102A, directly or via the proxy server 104.

Figure 5:
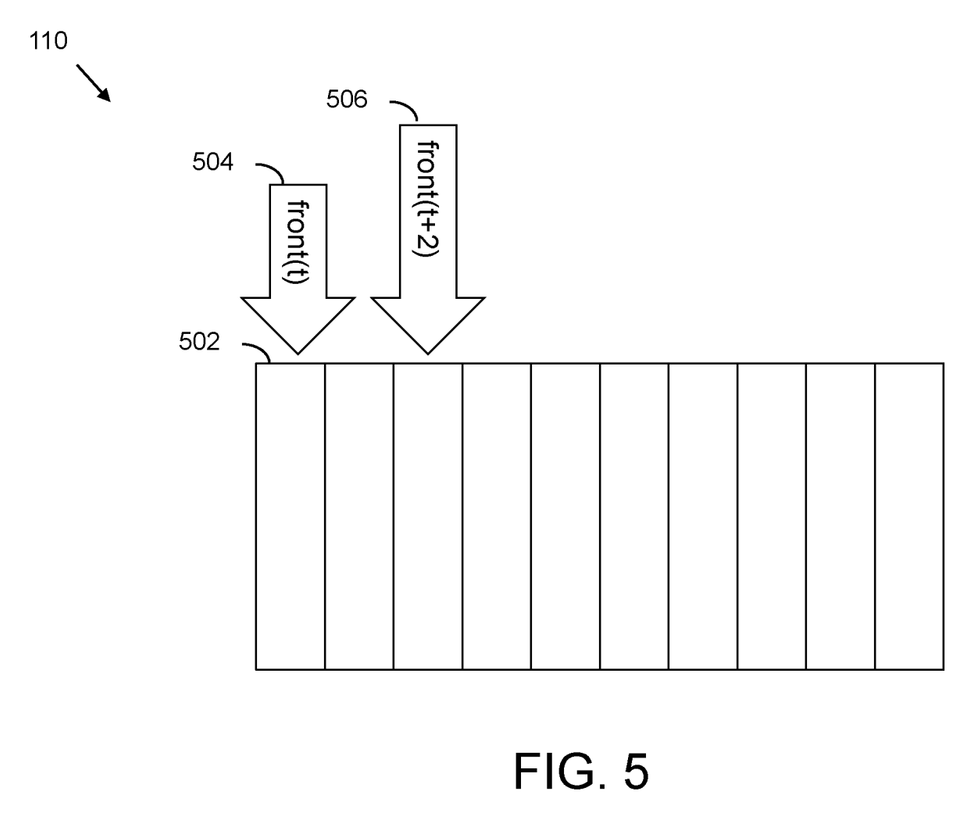
FIG. 5 is a diagram illustrating another implementation of the scheduling service, in accordance with some embodiments of the present disclosure.

FIG. 5 is a diagram illustrating another implementation of the scheduling service 110, in accordance with some embodiments of the present disclosure. The scheduling service 110 includes, in some embodiments, a ring buffer (e.g., queue) 502. Each backend server (e.g., site/service/cluster) 108A (and a proxy server 104 may front several) may be associated with an instance of the ring buffer 502, which can have an arbitrary but fixed size that advances as a periodically recalibrated, time-based rate. The ring buffer 502 as a vector with a pointer 504 to a front of the buffer. When a new request arrives, the scheduling service 110 can schedule it at the front of the queue, further back in the queue (up to the end, via the pointer 506), or reject it entirely.

In some embodiments, whenever the front pointer 504 reaches a slot with a request, the scheduling service 110 either reevaluates and schedules the request (if this request hasn't experienced that enough times) or issues it to the backend. In some embodiments, choice of placement leverages the delay function to determine how far from the front to "drop" the incoming request. If a slot is occupied, the proxy server 104 (e.g., the pointer 504) iterates further in the ring buffer to find the first open spot. If the beginning gets reached (by looping around), the proxy server 104 discards the request.

In some embodiments, a slot is available if it does not already have a request and if it satisfies an availability criterion. In some embodiments, the availability criterion is characterized by the following equation:

$$\text{floor}(10*q/n) <= p \% 10, \quad (4)$$

wherein p is the buffer position without respect to the queue's front (e.g., a physical address), q is the depth into the queue (with respect to the queue's front), and n is the buffer size. In one example wherein n=100, based on eqn. (4), the first 10 slots are always available (if not already filled with a request), 90% of the second 10 slots are available, 80% of the next 10 are available, and so on, such that 10% of the final 10 slots are available. In some embodiments, an intent of including availability criterion is to prevent an attacker from saturating a parade of requests approaching the backend by taking all spots as the spots open at the back of the queue (and, therefore, forcing new, high-priority requests to wait behind requests the backend is already working on).

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. An apparatus comprising a processor and a memory, wherein the memory includes programmed instructions that, when executed by the processor, cause the apparatus to:
   receive a request from a client;
   determine a family of metrics, wherein the family of metrics includes a cumulative backend queue time based on a plurality of requests;
   schedule the request based on the family of metrics; and
   in response to satisfying one or more scheduling criteria, send the request to a backend server, wherein the family of metrics includes a sum of one or more backend times, wherein each backend time is associated with a respective one of one or more other requests, and wherein more recent backend times are weighted more heavily than less recent backend times.

2. The apparatus of claim 1, wherein the family of metrics includes a cumulative backend utilization time.

3. The apparatus of claim 1, wherein the memory includes programmed instructions that, when executed by the processor, cause the apparatus to:
   receive a response from the backend server; and
   update the family of metrics at least based on a backend time of the request.

4. The apparatus of claim 3, wherein the memory includes programmed instructions that, when executed by the processor, cause the apparatus to:
   calculate the backend time using a time value received from the backend server as part of the response.

5. The apparatus of claim 1, wherein scheduling includes assigning a delay, and wherein satisfying one or more scheduling criteria includes the delay elapsing.

6. The apparatus of claim 5, wherein satisfying one or more scheduling criteria includes a rescheduling counter meeting or exceeding a rescheduling counter threshold when the delay elapses.

7. The apparatus of claim 1, wherein satisfying one or more scheduling criteria includes determining that a buffer is out of space between an assigned location of the buffer and an end of the buffer.

8. A non-transitory computer readable storage medium comprising instructions stored thereon that, when executed by a processor, cause the processor to:
   receive a request from a client;
   determine a family of metrics, wherein the family of metrics includes a cumulative backend queue time based on a plurality of requests;
   schedule the request based on the family of metrics; and
   in response to satisfying one or more scheduling criteria, send the request to a backend server, wherein the family of metrics includes a sum of one or more backend times, wherein each backend time is associated with a respective one of one or more other requests, and wherein more recent backend times are weighted more heavily than less recent backend times.

9. The medium of claim 8, wherein the family of metrics includes a cumulative backend utilization time.

10. The medium of claim 8, wherein a memory includes programmed instructions that, when executed by the processor, cause the processor to:
    receive a response from the backend server; and
    update the family of metrics at least based on a backend time of the request.

11. The medium of claim 10, further comprising instructions stored thereon that, when executed by the processor, cause the processor to:
    calculate the backend time using a time value received from the backend server as part of the response.

12. A computer-implemented method comprising:
    receiving a request from a client;
    determining a family of metrics, wherein the family of metrics includes a cumulative backend queue time based on a plurality of requests;
    scheduling the request based on the family of metrics; and
    in response to satisfying one or more scheduling criteria, sending the request to a backend server, wherein the family of metrics includes a sum of one or more backend times, wherein each backend time is associated with a respective one of one or more other requests, and wherein more recent backend times are weighted more heavily than less recent backend times.

13. The method of claim 12, wherein the family of metrics includes a cumulative backend utilization time.

14. The method of claim 12, further comprising:
    receiving a response from the backend server; and
    updating the family of metrics at least based on a backend time of the request.

* * * * *